Patented Apr. 21, 1925.

1,534,240

UNITED STATES PATENT OFFICE.

SPENCER B. NEWBERRY, OF CLEVELAND, OHIO; ANDREW W. NEWBERRY, EXECUTOR OF THE ESTATE OF SAID SPENCER B. NEWBERRY, DECEASED, ASSIGNOR, BY DIRECT AND MESNE ASSIGNMENTS, TO SANDUSKY CEMENT COMPANY, OF CLEVELAND, OHIO, A CORPORATION OF OHIO.

CEMENT PAINT.

No Drawing.   Application filed May 29, 1922.   Serial No. 564,594.

*To all whom it may concern:*

Be it known that I, SPENCER B. NEWBERRY, a citizen of the United States, and residing at Cleveland, Cuyahoga County, State of Ohio, have invented certain new and useful Improvements in Cement Paint, of which the following is a specification.

It is well known that Portland cement mixed with water to the consistency of cream may be used as a paint for concrete, metal or wood, but that unless kept moist for some time after applying, the cement coating hardens imperfectly and is easily washed away by rain. I have found that this defect may be overcome by incorporating with the cement certain materials which have the property of holding moisture or absorbing moisture from the air, also of retarding the setting of cement, and that a paint composed of Portland cement with such additions becomes sufficiently firm and hard after a few hours to resist injury from rain, and continues to harden, forming a permanent enamel-like surface.

A substance which I have found very effective in retarding the set of cement is alumina in soluble form, preferably as an alkali metal aluminate, for example, sodium aluminate. Only a very small amount of this is required, for example, one tenth to one per cent of the weight of the cement.

The substances which I have found most effective in retaining moisture, thus enabling cement to set and harden without further application of water, are deliquescent or hygroscopic salts such as caustic soda, potassium carbonate, and the chlorides of alkaline earth metal, such as calcium chloride or magnesium chloride. Ammonium chloride may also be used, as this in contact with cement gives off ammonia and forms calcium chloride. The amount of hygroscopic salt required may vary from perhaps one per cent to ten per cent of the weight of cement used.

It is understood that alumina in soluble form such as sodium aluminate without the addition of a hygroscopic salt may be used with satisfactory results. I prefer however to add both aluminate and a hygroscopic salt such as calcium chloride.

For practical use the cement and the salts in suitable quantity are ground together to a fine, dry powder which may be kept preferably in closed containers until required for use. The cement paint is made by mixing the powder with water to the consistency of a thin cream, for which the addition of 40 to 60 per cent of water will be required. The paint is then applied by means of brushes in the usual manner, or spread upon the surface by a jet of compressed air.

By a soluble aluminum compound I mean the water soluble compound of aluminum and an alkali metal, as for example, sodium or potassium aluminate; $3Na_2O Al_2O_3$ or $3K_2O Al_2O_3$, or any of the alums, which are water-soluble sulphates of aluminum and potassium, sodium or ammonium.

By a hygroscopic salt I mean a salt which absorbs water from the air, for example, caustic soda, potassium carbonate, or the chloride of an alkaline earth metal or an earth metal such as calcium chloride or magnesium chloride, or a soluble chloride such as ammonium chloride which will form calcium chloride in contact with cement.

Having thus described the invention what is claimed as new and desired to be secured by Letters Patent is:

1. A composition of matter for use as a cement paint base containing Portland cement and a water-soluble aluminum salt, the cement forming more than fifty per cent by weight of the composition.

2. A composition of matter for use as a cement paint base containing Portland cement and one-tenth to one per cent of a water-soluble aluminum salt, the proportion of cement by weight being greater than half of the total weight of the mixture.

3. A cement paint base containing Portland cement incorporated with a water-soluble aluminum salt and a hygroscopic salt.

4. A cement paint base consisting of Portland cement incorporated with one-tenth to one per cent of its weight of a water-soluble aluminum salt and one per cent to ten per cent of its weight of a hygroscopic salt.

5. A cement paint base consisting of Portland cement incorporated with a water-soluble aluminum salt and an alkaline earth metal chloride.

6. A cement paint base consisting of Portland cement incorporated with one-tenth to one per cent of its weight of a water-soluble aluminum salt and one per cent to ten per cent of its weight of an alkaline earth metal chloride.

7. A cement paint consisting of Portland cement incorporated with a water-soluble aluminum salt and a hygroscopic salt and mixed with water for use.

8. A cement paint consisting of Portland cement incorporated with one-tenth to one per cent of its weight of a water-soluble aluminum salt and one per cent to ten per cent of its weight of an alkaline earth metal chloride and mixed with water for use.

In testimony whereof I hereunto affix my signature.

SPENCER B. NEWBERRY.